United States Patent

[11] 3,533,449

[72] Inventor Jay S. Gallinger
     Wilmington, Delaware
[21] Appl. No. 791,046
[22] Filed Jan. 14, 1969
     Continuation-in-part of Ser. No. 569,881,
     Aug. 3, 1966, now Patent No. 3,451,243
[45] Patented Oct. 13, 1970
[73] Assignee Galaxie Manufacturing Co.
     Wilmington, Delaware
     a company of Delaware

[54] FLANGED PIPE PRODUCT
     5 Claims, 4 Drawing Figs.
[52] U.S. Cl. ............................................. 138/109,
                                                    285/410
[51] Int. Cl. ................................................... F16l 19/02

[50] Field of Search ............................................. 138/109,
                                           96; 285/390, 410, 366; 72/124

[56]                References Cited
             UNITED STATES PATENTS
2,941,823   6/1960   Good ........................... 285/410X
                FOREIGN PATENTS
638,077   3/1962   Canada .................... 135/109

Primary Examiner— Louis K. Rimrodt
Attorney— Cushman, Darby and Cushman

ABSTRACT: A flanged pipe includes concentric serrations which are formed on a face of the pipe flange without cutting any material from the flange. The serrations are formed by a rolling action which displaces material and which substantially eliminates residual tension stresses in the finished product.

INVENTOR
JAY S. GALLINGER
BY Cushman, Darby & Cushman
ATTORNEYS

Patented Oct. 13, 1970

INVENTOR

JAY S. GALLINGER 3,533,449

FLANGED PIPE PRODUCT

This application is a continuation-in-part of my copending application Ser. No. 569,881, filed Aug. 31, 1966 now U.S. Pat. No. 3,451,243 granted June 24, 1969.

BACKGROUND AND BRIEF DESCRIPTION OF INVENTION

This invention relates to a novel pipe product having a flange formed integrally with the pipe and having serrations formed in a face of the flange. The serrated flange is characterized by its properties of being stronger, more resistant to fatigue and corrosion cracking, and more easily manufactured than prior serrated flanges which have been assembled on pipes.

Generally, it is known to form a smooth flange on the end of a pipe so that the flange is an integral structure with the pipe. A method for forming such a smooth flanged pipe is shown in Lindberg U.S. Pat. No. 1,421,507, and various types of apparatus have been utilized to produce such flanges. Also, it is known to cut concentric serrations in separate flange pieces which are assembled as end portions to pipes, such as shown in Albro U.S. Pat. No. 3,253,449, and such serrated flanges are manufactured by actually cutting and removing material from the face of a flange piece. In my copending application, as identified above, I have described methods for simultaneously forming serrations and flanges as integral structures of pipes. This application is directed to a pipe product which can be produced with an integral, lapped flange which is sufficiently strong to be serviceable under a wide range of conditions even though serrations are formed into the flange. Prior to my own invention, it has been considered a practical impossibility to provide a strong, flanged, integral pipe structure by the known processes of cutting and removing material from the lapped end of a pipe.

The product of the present invention comprises a pipe having a radially disposed flange formed by lapping an end of the pipe. The flange has a substantially flat face which can be abutted against a similar flange face of an adjoining pipe (or against a gasket between flanged pipes), and the flat face of the flange includes serrations which are formed into the face without substantially reducing the thickness of the flange and without removing any of the material from which the flange is formed. It has been found that the pipe product which results from a rolling displacement of material from the surface of a flange results in an improved product in which substantially all residual stresses are compressive. This product is in complete contrast to pipes having serrations formed by cutting and removing material inasmuch as a cutting or machining operation results in a surface having residual tension stresses. In many chemical services, materials fail from a type of fatigue known as stress corrosion cracking which is caused by a corrosive environment as combined with residual tensile stresses in a material. Thus, it is desirable and preferred to eliminate residual tension stresses as much as possible, and, in fact, it has been a prior practice to treat a machined surface to induce compressive stresses so as to extend its fatigue life. Typically, a machined surface is treated by shot peening to induce such compressive stresses. The present invention eliminates any requirement for costly treating steps or special assemblies for flanged pipes, and the improved pipe product of this invention can be easily manufactured as a unitary structure in accordance with the method described in my copending application.

These and other advantages of this invention will become apparent in the more detailed discussion which follows, and in that discussion reference will be made to the accompanying drawings which will be briefly described below.

DETAILED DESCRIPTION OF INVENTION

Flanges may be formed as integral structures with end portions of pipes by working and bending an end portion of a pipe radially outwardly against a die surface until a desired development of a flange has been attained. This type of flange formation is considered a lapping operation, and the present invention is particularly concerned with flanges formed by such a lapping operation. As already mentioned, the Lindberg patent illustrates suitable apparatus for developing a flange at a pipe end. The apparatus illustrated in the Lindberg patent is an example of an early arrangement for forming pipe flanges, but more recent apparatus places a roller means against an inner surface of a protruding pipe section for working the protruding section against a die shell in which the pipe is held. Such apparatus includes means for pneumatically or hydraulically positioning the roller device so that its axis of rotation may be changed relative to the longitudinal axis of the pipe. In this way, a roller means may be initially placed against the inside surface of a pipe end and rotated around the circumference of that surface to work that surface into a condition for shaping. The same roller means is then slowly adjusted in its position relative to the pipe so that the axis of rotation for the roller moves away from the central axis of the pipe, and thus the pipe end is ultimately developed into a flange which extends radially outwardly from the pipe and at approximate right angles to the central longitudinal axis of the pipe. Such apparatus is well known in the art for lapping or flanging pipe ends, but prior methods have required additional apparatus and separate operations to finish formed flanges so as to include concentric serrations in their exposed faces.

Figure 1:
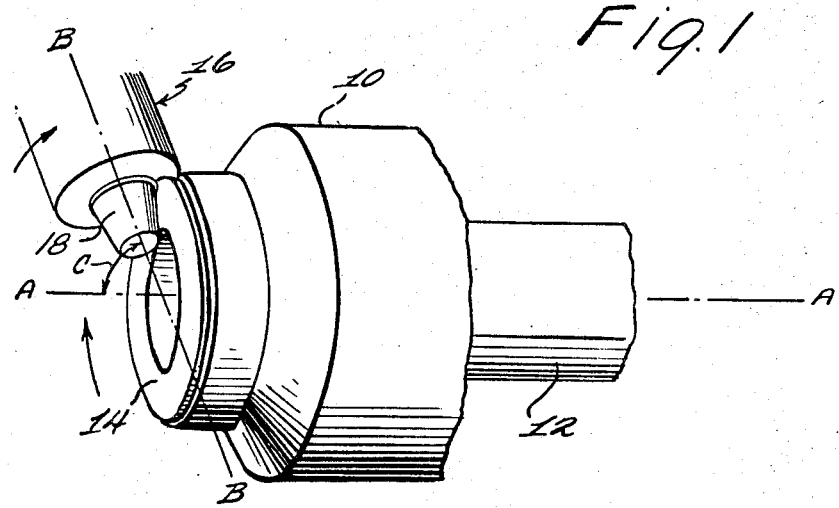
FIG. 1 represents an overall perspective view of typical apparatus which may be used to form a flanged pipe product of the type contemplated by the present invention.

In order to illustrate a method for forming the product of this invention, FIG. 1 shows typical apparatus which may be used for simultaneously forming and serrating a flange on a pipe end without cutting any material from the flange face. A die shell 10 is designed to carry a pipe section 12 which is to be formed with a flanged end, and the pipe section is placed in the die shell so as to leave an end portion 14 protruding therefrom. In the illustration of FIG. 1, the end portion has been worked radially outwardly from the longitudinal axis A–A of the main pipe body so as to develop the illustrated flange on the end of the main pipe body 12. FIG. 1 also shows a roller means 16 positioned adjacent to the die shell for a working contact with the protruding end portion of the pipe. The roller means 16 includes a smooth working portion 18 which contacts the inner surface of the pipe end to develop it into the flange which is shown. Of course, the roller means 16 is suitably mounted on apparatus which can be moved toward and away from the die shell 10, and such conventional apparatus has been omitted from the drawings for clarity since machines of this type are well known in the art. The apparatus which carries the roller means 16 also includes means for moving the roller means relative to the circumference of the pipe end, and additionally, control means are included for changing the angle C between the central longitudinal axis A–A of the pipe and the axis of rotation B–B of the roller means. In a typical apparatus, the roller means is driven about its axis B–B while being orbited around the axis A–A of the pipe so as to contact and develop the protruding end portion of the pipe. As the flange is developed, a typical apparatus includes pneumatic means for changing the angle C between the axes A–A and B–B so that the roller means 16 causes the pipe end portion to bend outwardly against an outside surface of the die shell 10.

Figure 2:
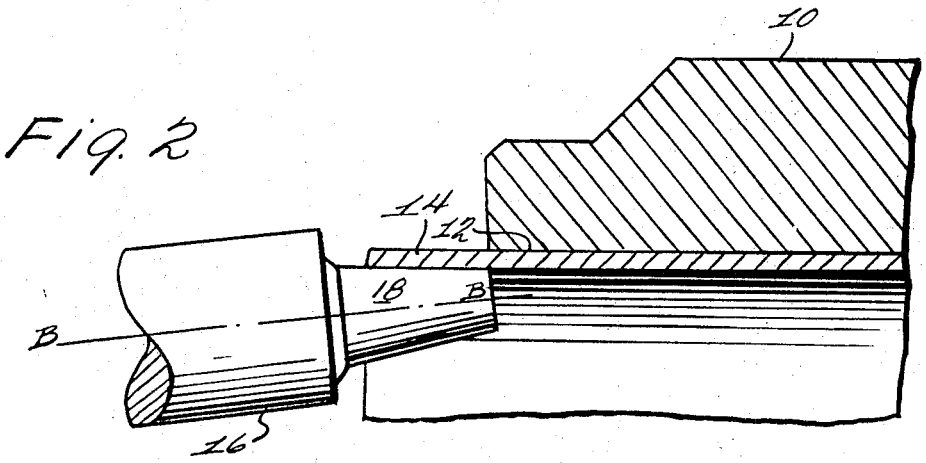
FIG. 2 illustrates in cross section a portion of a pipe end which is being held in a die shell to receive lapping and serrating operations, and an initial step in a typical process as illustrated.
Figure 3:
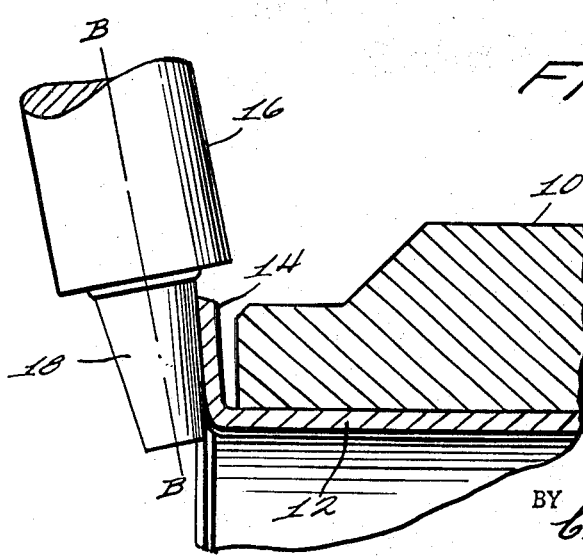
FIG. 3 illustrates a further step from that shown in FIG. 2, and in this step the flange is partially formed to a position which is slightly less than its final relationship to the main body of the pipe.
Figure 4:
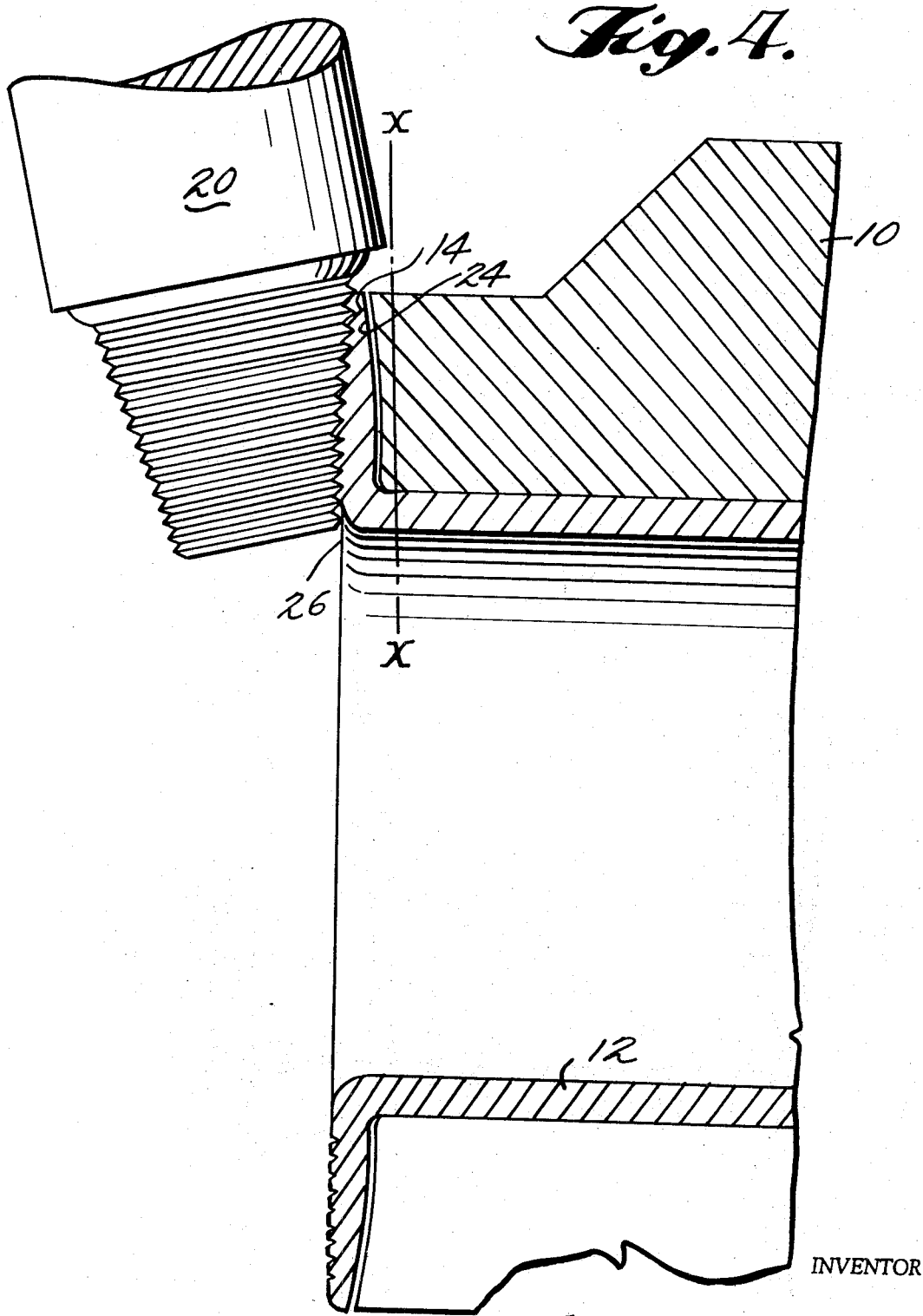
FIG. 4 is a similar view to FIGS. 2 and 3 and illustrates a final step in a typical process for finishing a flange and for simultaneously applying serrations to a face of the flange to form the pipe product of this invention.

FIGS. 2 through 4 illustrate a series of steps in a process for producing the product of the present invention, and the apparatus used is similar to that described for FIG. 1. At the beginning of the process a pipe 12, or whatever other tubular structure is being worked, is placed within a bore of the die shell 10 so that an end portion 14 of the pipe protrudes out of the die shell, as illustrated. Then, the apparatus which carries the roller means 16 is moved toward the protruding end portion of the pipe to contact the inner surface of the end portion. The initial contact between the smooth-surfaced roller 16 and the protruding end portion of the pipe is shown in FIG. 2, and once the roller means is in position, the apparatus can be operated to orbit the roller about the entire circumference of the pipe end. As the roller means is orbited, the roller rotates on its axis B–B, and the smooth surface 18 of the roller begins to work the material of the protruding pipe portion.

Then the roller means 16 is slowly adjusted, such as by pneumatic control devices, to apply a pressure against the inner surface of the pipe end, and as the axis B–B is changed relative to a longitudinal axis of the pipe, the end portion is flared radially outwardly to form a flange. FIG. 3 illustrates the partial formation of a flange, as developed from the end portion 14 of the main pipe body. In the FIG. 3 position, the roller means 16 has been adjusted from the initial position shown in FIG. 2 so as to develop a flange which approaches an approximate 90° angle relative to the longitudinal axis of the pipe. However, it has been found that the desired serrations for such a flange can be developed during the flange forming operation if the smooth-surfaced roller is replaced by a serrated surfaced roller prior to the completion of the flange forming sequence.

FIG. 4 shows that the roller with a smooth surface 18 has been replaced by a roller 20 having equally spaced annular grooves or serrations cut into its flange contacting surface. When the serrated roller 20 is engaged with the exposed flange surface (which was initially the inner surface of the pipe end 14), there are formed concentric serrations in the flange face corresponding to the grooves cut into the roller 20. After the roller 20 is engaged against the exposed flange face, it is then moved further by the above-mentioned pneumatic means to press into the flange surface and to form the concentric serrations therein. This formation of serrations is a result of a rolling displacement of material into the grooves cut into the roller 20 and away from contact points between the roller and the flange surface. This displacement is accomplished with substantially no reduction in thickness of the flange and with substantially no residual tension stresses left in the flange face. In fact, the rolling displacement of material results in residual compressive stresses which are of less concern to corrosion cracking problems than are tension stresses. The resulting serrations are concentric and have flat areas between each groove, as shown in the lower portion of FIG. 4. In a preferred process, it has been found that the step of forming concentric serrations in the flange face should be carried out before the flange is fully formed to its final position. In a typical flange formation, it is desired to produce a flange which extends radially outwardly from a pipe body at an angle of approximately 90° as related to an axis of the pipe body. When such a flange is to be formed, it has been found that the initial steps of the process, which may include the use of a smooth-surfaced roller, should be applied until the flange is partially formed to a position within the range of 86° to 88° as related to the central longitudinal axis of a uniform diameter pipe. When this partially formed flange has been produced, the pipe is removed from holding dies, and the smooth-surfaced roller is replaced by a serrated surfaced roller 20. Then the pipe is reinserted in the holding dies, or die shell, and final forming and serrating takes place while the flange is being developed to its final position of approximately 90° as related to the pipe body. FIG. 4 illustrates the final position of the serrated roller for forming such a 90° flange, and also a specially shaped die shell is illustrated wherein the upright face portion 24 of the die shell is shaped to receive the back side of the formed flange. The usual die shell face is flat as indicated by the dotted lines X–X, but the die shell which is illustrated is built up to support the flange during the serrating operation. Also the corner 26 of the die is shaped with a radius to accommodate the formed radius on the back side of the flange.

As an example of a product of the present invention, a serrated flange has been produced which has spaced serrations having flat topped peaks of approximately .020 inches in width and having groove walls between the peaks that are at 45° angles to the flat peaks. Pipe sizes ranging from one-half inch to six inches (with outside diameters from .840 to 6.625 inches) have been formed with serrated flanges having outside diameters for the laps ranging from 1⅜ inches to 8½ inches. The serrations formed in the various pipe sizes are of the desired configuration and offer improved characteristics over machined serrations formed by separate processes. This invention is useful for pipe products made from various metal materials, such as copper, aluminum, brass, carbon steel, Monel, nickel, Inconel and stainless steel, and also for nonmetal materials such as thermoplastic materials.

I claim:

1. An improved unitary pipe product having a flange formed by lapping an end of a pipe body, with said flange having a substantially flat face which can be abutted against a similar flange face of an adjoining pipe, and including serrations formed on the surface of said flat face without a substantial reduction in thickness of the flange and without removing any of the material from which the flange is formed, thereby providing an improved pipe product having a strong, unweakened, serrated flange formed integrally therewith.

2. The improved pipe of claim 1 wherein said pipe product is formed from metal or metal alloy.

3. The improved pipe of claim 1 wherein said pipe product is formed from a thermoplastic material.

4. The improved pipe of claim 1 wherein the serrations formed in the face of the flange are rolled onto the surface of the flange by a deforming means.

5. The improved pipe of claim 1 wherein said serrations are concentric.